Dec. 25, 1923.  J. W. AMICO  1,478,811
TIRE TOOL METHOD
Filed March 5, 1923
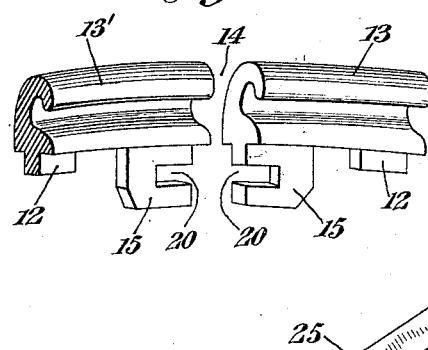
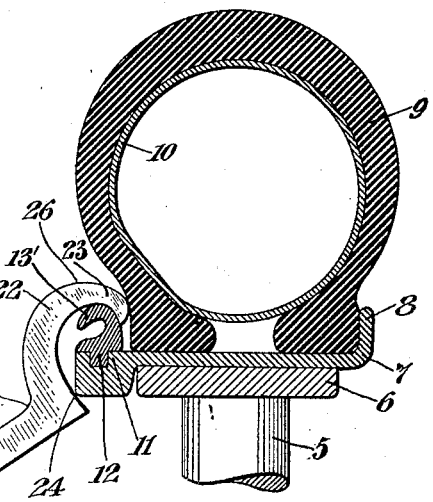
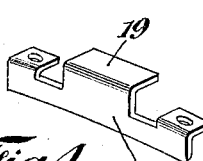
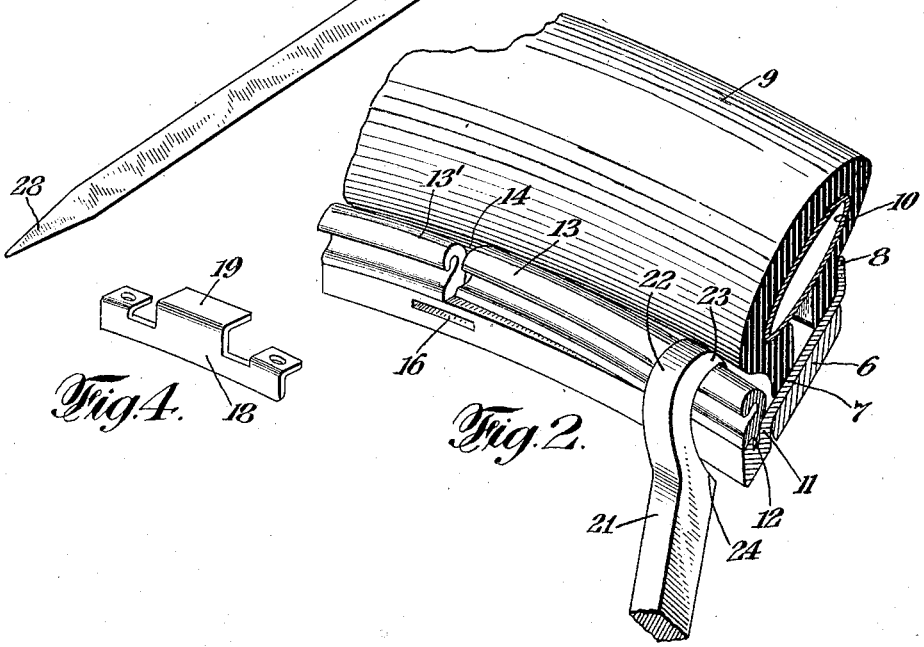
Inventor
James W. Amico
By his Attorneys
Ward, Crosby & Smith Patented Dec. 25, 1923.

1,478,811

UNITED STATES PATENT OFFICE.

JAMES W. AMICO, OF RYE, NEW YORK.

TIRE-TOOL METHOD.

Application filed March 5, 1923. Serial No. 622,775.

*To all whom it may concern:*

Be it known that I, JAMES W. AMICO, a citizen of the United States, and resident of Rye, county of Westchester, State of New York, have invented certain new and useful Improvements in Tire-Tool Methods, of which the following is a specification.

My invention relates to improvements in tire tool methods and more particularly for putting and securing in place pneumatic shoes on wheels rims which employ a removable split retaining ring for holding the shoe or tire on the rim. The main object of the invention is to provide a simple and efficient method for the purpose in question which is accomplished with a tool which is not only low in cost but also convenient in operation.

Further and more specific objects, features and advantages will more clearly appear from the detail description given below taken in connection with the accompanying sheet of drawings which illustrate the invention in a preferred form thereof and which drawings form a part of this specification. In the drawings Fig. 1 is a transverse section through an automobile tire and wheel rim, showing the tool applied thereto. Fig. 2 is a perspective of a section of the same also showing the tool applied thereto. Fig. 3 is a detail illustrating the construction of the ends of the split retaining ring shown in Figs. 1 and 2 and Fig. 4 is a perspective of the locking member used in the construction shown.

Referring to the drawings, 5 represents the spokes of an automobile wheel having the circumferential felloe 6 rigidly attached thereto to which is removably attached the metal rim 7. The metal rim 7 is provided with an integral upturned flange 8 on one side to engage and hold in place on the rim one side of the shoe 9 which contains the usual inner tube 10. On the opposite side the rim 7 is provided with a groove 11 adapted to receive and hold a rib 12 of a split retaining ring 13, 13' split as at 14. The ends of the split retaining ring 13 are provided with locking lugs 15 adapted to extend into suitable apertures in the edge of the rim 7, the rim 7 being provided at this point with a transverse aperture 16 into which may be inserted a locking member 18 having a transverse portion 19 adapted to extend into the rim 7 sufficient to engage the cutaway portions 20 of lugs 15 so as to lock the ends of the split ring 13, 13', firmly in operative position on the rim 7.

In putting on such a shoe or tire on such an automobile rim, the shoe is first slipped on to the rim, the split ring 13 having been removed. After the shoe 9 has been placed on the rim substantially in the position shown in Figs. 1 and 2, one end 13' of the split ring is placed in position with its lug 15 extending into its cooperating socket in the rim 7. Thereupon the tire tool 21 is placed in position as shown in Fig. 1 over the end 13' of the split ring. The tool 21 comprises an integral bar having a hooked shaped end 22, the upper part of which at 23 is adapted to extend over and bear against the shoe retaining ring and the opposite part of which at 24 is adapted to extend under the edge of the rim 7 and engage the same with the cam action. The tool having been placed over the end 13' of the split retaining ring as shown in Fig. 1, the integral handle 25 of the tool is pressed downwardly as viewed in Fig. 1 so that the cam face at 24 by its engagement with the lower edge of the rim tends to force the split ring into operative position on the rim with the rib 12 in groove 11. If the rib 12 does not readily go into place in the groove 11 with this action, one may tap on the top of the hooked shaped portion of the tool with a hammer as at 26 is order to drive the rib 12 of the split ring into the groove 11 and with simultaneous pressure on the handle member 25 the tool will hold this portion of the split ring in place with the rib 12 in the groove 11. In order to obtain suitable cam action the hooked shaped portion 22 is so constructed that upon pressing downwardly on the handle 25 as viewed in Fig. 1, the cam action will tend to cause the hook part 23 to pull or force the spilt ring into place with the rib 12 in operative position in the groove 11. After the end 13' of the split ring has been thus forced into place, the tool is tapped on its side with a hammer in order to slide the tool along the rim and split ring a short distance whereupon the operation is repeated to force that part of the split ring into operative position with the rib 12 in place in groove 11. Then the tool is again tapped on its side with a hammer while still substantially maintaining the pressure on the handle 25 until the tool comes to another point along the split ring where the operation is further repeated and these operations are repeated until the entire length of the split retaining ring is forced into operative position with the rib 12 in the groove 11 around the entire circumference. In Fig. 2 the tool is shown at a point on the split ring near the end of the operation, that is, near the other end 13 of the split ring and when the tool reaches the end 13 of the split ring it forces that end into operative position with its lug 15 forced down into the cooperating aperture in the rim whereupon the locking member 18 is put into place with the flange 19 extending into the aperture 16 and through the cutaway portions 20, 20 so that both ends of the split ring 13, 13' are locked in operative position and the split ring will effectively hold the shoe 9 on the rim 7.

It will thus be seen that the tool 21 comprises an integral bar having a hooked shaped portion at 22 with one end adapted to extend over and bear against the shoe retaining ring and a part opposite said portion adapted to engage under the rim of the wheel with a cam action as at 24 and a handle portion 25 extending outwardly, the handle portion 25 being integral with said hooked shaped portion, and said handle portion extending outwardly therefrom whereupon by pressing the handle portion toward the wheel hub, the cam action exerted by the part which extends under the rim causes the hooked shaped end to tend to force the retaining ring into operative position on the rim as the tool is caused to travel about the circumference of the rim and ring in the manner above described. The handle of the tool is preferably tapered down as shown at 25 and this tapered portion may be effectively used in prying off the retaining ring from the rim and also prying off the shoe from the ring after the retaining ring has been removed, in the removal of the shoe from the wheel.

While I have described my improvements in great detail and with respect to a preferred form of the invention, I do not desire to be limited to such details or form since various changes may be made and the invention embodied in many different forms without departing from the spirit and scope of the invention, and I desire to cover all forms coming within the language or scope of one or more of the appended claims.

What I claim as new and desire to secure by Letters Patent is:

The method of putting in place the shoe retaining ring on the rim of a wheel which consists in placing one end of the ring in position on the rim, applying thereto a tool having a handle and a hooked end extending over and bearing against the shoe retaining ring with the part opposite the hooked end engaging under the rim of the wheel with a cam action to force the ring in position on the rim, then knocking the tool circumferentially about the ring and rim while applying pressure to the tool handle to force the ring into place on the rim about the entire circumference of the rim.

In testimony whereof I have signed my name to this specification.

JAMES W. AMICO.